US012228585B2

(12) United States Patent
Sagae et al.

(10) Patent No.: US 12,228,585 B2
(45) Date of Patent: Feb. 18, 2025

(54) AUTOMATIC ANALYZER

(71) Applicant: Hitachi High-Tech Corporation, Tokyo (JP)

(72) Inventors: Nozomi Sagae, Tokyo (JP); Emiko Ushiku, Tokyo (JP); Kenichi Takahashi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 726 days.

(21) Appl. No.: 17/277,417

(22) PCT Filed: Oct. 7, 2019

(86) PCT No.: PCT/JP2019/039428
§ 371 (c)(1),
(2) Date: Mar. 18, 2021

(87) PCT Pub. No.: WO2020/085055
PCT Pub. Date: Apr. 30, 2020

(65) Prior Publication Data
US 2022/0034930 A1   Feb. 3, 2022

(30) Foreign Application Priority Data

Oct. 26, 2018   (JP) ................... 2018-201395

(51) Int. Cl.
*G01N 35/02*     (2006.01)
*G01N 35/10*     (2006.01)
*G01N 35/00*     (2006.01)

(52) U.S. Cl.
CPC ....... *G01N 35/1016* (2013.01); *G01N 35/025* (2013.01); *G01N 35/1002* (2013.01);
(Continued)

(58) Field of Classification Search
CPC ............ G01N 35/1016; G01N 35/025; G01N 2035/00633; G01N 2035/00891;
(Continued)

(56) References Cited

U.S. PATENT DOCUMENTS

2002/0037239 A1   3/2002   Komatsu
2004/0048393 A1   3/2004   Colin et al.
2015/0369833 A1   12/2015  Nakasawa et al.

FOREIGN PATENT DOCUMENTS

JP   H11132830 A   5/1999
JP   H11316239 A   11/1999
(Continued)

OTHER PUBLICATIONS

Search Report mailed Jul. 6, 2022 in European Application No. 19876433.4.
(Continued)

*Primary Examiner* — Robert R Raevis
(74) *Attorney, Agent, or Firm* — Miles & Stockbridge, P.C.

(57) ABSTRACT

An automatic analyzer that sets thresholds of measurement items and remaining reagent amounts. A reagent is dispensed, and checked whether a dead volume is set. If the dead volume is not set, and if the amount of a reagent in a reagent bottle is equal to or larger than a dead volume default value, the process proceeds to the measurement of the next specimen, and if the amount is smaller than the default value, the use of the reagent bottle is ended, the reagent bottle is replaced, and the measurement is continued. If the dead volume is set, if the remaining amount of the reagent in the reagent bottle is equal to or larger than the setting amount, the process proceeds to the measurement of the next
(Continued)

specimen, and if not, the use of the reagent bottle is ended, the reagent bottle is replaced, and the measurement is continued.

13 Claims, 7 Drawing Sheets

(52) U.S. Cl.
CPC .............. *G01N 2035/00633* (2013.01); *G01N 2035/00891* (2013.01)

(58) Field of Classification Search
CPC ......... G01N 35/00584; G01N 35/1002; G01N 2035/0091; G01N 2035/1025; G01N 2035/00653
USPC ..... 73/863.01, 53.01, 64.56, 864.21, 864.24, 73/864.25; 422/82.05–82.11
See application file for complete search history.

(56) References Cited

FOREIGN PATENT DOCUMENTS

| | | | |
|---|---|---|---|
| JP | 200298706 A | | 4/2002 |
| JP | 2002350454 A | | 12/2002 |
| JP | 2007322241 A | | 12/2007 |
| JP | 2008190959 A | * | 8/2008 |
| JP | 200936512 A | | 2/2009 |
| JP | 2009180605 A | | 8/2009 |
| JP | 2010139485 A | | 6/2010 |
| JP | 2012117953 A | | 6/2012 |
| JP | 2014145677 A | | 8/2014 |
| JP | 2017129393 A | | 7/2017 |
| WO | 2018051672 A1 | | 3/2018 |

OTHER PUBLICATIONS

International Preliminary Report on Patentablity mailed Apr. 27, 2021 in International Application No. PCT/JP2019/039428.
Search Report mailed Nov. 26, 2019 in corresponding International Application No. PCT/JP2019/039428.
Written Opinion mailed Nov. 26, 2019 in corresponding International Application No. PCT/JP2019/039428.
Office Action mailed Jan. 6, 2024 in Chinese Application No. 201980057145.6.

* cited by examiner

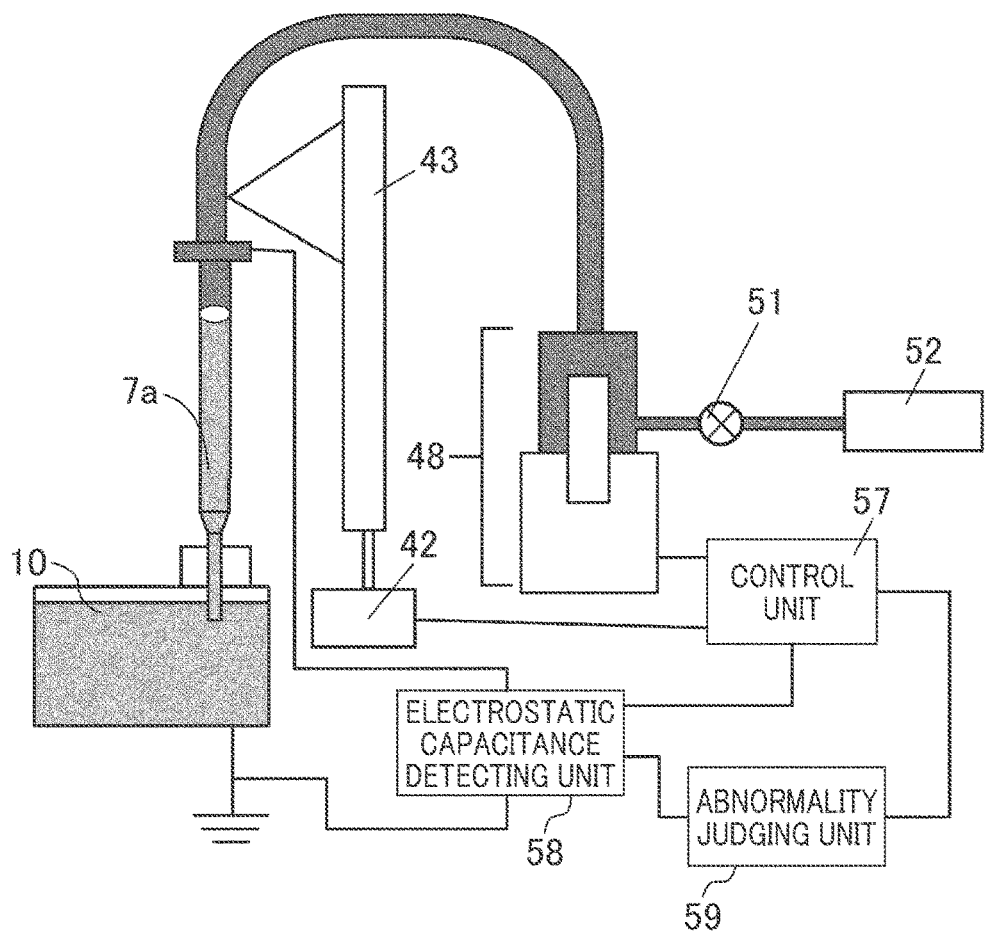

FIG.5

DEAD VOLUME SETTING SCREEN

SETTING METHOD
○ NOT SET
○ ITEM
● ITEM + BOTTLE SHAPE
○ WETTABILITY
○ APPARATUS-SPECIFIC VALUE

| NO. | BOTTLE SHAPE | ITEM NAME | SETTING VALUE | |
|---|---|---|---|---|
| ✓ 1 | TYPE A ▽ | IgA ▽ | 30 | TEST |
| ✓ 2 | TYPE B ▽ | ALB ▽ | 50 | TEST |
| ☐ 3 | TYPE C ▽ | ALB ▽ | 50 | TEST |

301　302　303

[REGISTER] [DELETE]

FIG.6

DEAD VOLUME SETTING SCREEN

SETTING METHOD
○ NOT SET
○ ITEM
○ ITEM + BOTTLE SHAPE
● WETTABILITY
○ APPARATUS-SPECIFIC VALUE

DEAD VOLUME VALUE SETTINGS
403
　WETTABILITY: LOW   [50] TEST
　WETTABILITY: MEDIUM [30] TEST

WETTABILITY: LOW

| NO. | ITEM NAME | |
|---|---|---|
| ✓ 1 | IgA ▽ | |
| ☐ 2 | ALB ▽ | |
| ☐ 3 | Fe ▽ | |

WETTABILITY: MEDIUM

| NO. | ITEM NAME | |
|---|---|---|
| ✓ 1 | CRE ▽ | |
| ✓ 2 | CRP ▽ | |
| ☐ 3 | — ▽ | |

401　402

[REGISTER] [DELETE]

FIG.11

DEAD VOLUME SETTING SCREEN

SETTING METHOD
○ NOT SET
● ITEM
○ ITEM + BOTTLE SHAPE
○ WETTABILITY
○ APPARATUS-SPECIFIC VALUE

201

| | NO. | ITEM NAME | SETTING VALUE | |
|---|---|---|---|---|
| ✓ | 1 | IgA | 3 | mm |
| ✓ | 2 | ALB | 5 | mm |
| | 3 | Fe | 4 | mm |

202  203

REGISTER  DELETE

FIG.12

DIP AMOUNT SETTING SCREEN

SETTING METHOD
○ NOT SET
● ITEM
○ ITEM + BOTTLE SHAPE
○ WETTABILITY
○ APPARATUS-SPECIFIC VALUE

201

| | NO. | ITEM NAME | SETTING VALUE | |
|---|---|---|---|---|
| ✓ | 1 | IgA | 0.01 | mm |
| ✓ | 2 | ALB | 0.02 | mm |
| | 3 | Fe | 0.03 | mm |

202  204

REGISTER  DELETE

FIG.13

DIP AMOUNT SETTING SCREEN

SETTING METHOD
- ○ NOT SET
- ○ ITEM
- ● ITEM + BOTTLE SHAPE
- ○ WETTABILITY
- ○ APPARATUS-SPECIFIC VALUE

| NO. | BOTTLE SHAPE | ITEM NAME | SETTING VALUE |
|---|---|---|---|
| ✓ 1 | TYPE A ▽ | IgA ▽ | 0.01 mm |
| ✓ 2 | TYPE B ▽ | ALB ▽ | 0.03 mm |
| ☐ 3 | TYPE C ▽ | ALB ▽ | 0.01 mm |
| ⋮ | | | |

301   302   304

[REGISTER] [DELETE]

FIG.14

DIP AMOUNT SETTING SCREEN

SETTING METHOD
- ○ NOT SET
- ○ ITEM
- ○ ITEM + BOTTLE SHAPE
- ● WETTABILITY
- ○ APPARATUS-SPECIFIC VALUE

DIP AMOUNT VALUE SETTINGS
404
  WETTABILITY: LOW  [0.03] mm
  WETTABILITY: MEDIUM  [0.01] mm

WETTABILITY: LOW

| NO. | ITEM NAME |
|---|---|
| ✓ 1 | IgA ▽ |
| ☐ 2 | ALB ▽ |
| ☐ 3 | Fe ▽ |
| ⋮ | |

401

WETTABILITY: MEDIUM

| NO. | ITEM NAME |
|---|---|
| ✓ 1 | CRE ▽ |
| ✓ 2 | CRP ▽ |
| ☐ 3 | — ▽ |
| ⋮ | |

402

[REGISTER] [DELETE]

AUTOMATIC ANALYZER

TECHNICAL FIELD

The present invention relates to an automatic analyzer including a mechanism that manages the remaining amounts of reagents.

BACKGROUND ART

In an automatic analyzer, a sample (sample) is mixed with a reagent, and the absorbance of the obtained reaction liquid is measured to determine the concentration of a target substance in the sample. If there is a shortage of the reagent at this time, the reaction with the sample becomes insufficient, and accurate measurement results cannot be obtained.

Because of this, many analyzers manage remaining reagent amounts by using liquid surface sensors or software counting. As such management methods, for example, there are known methods like one described in Patent Literature 1 in which the down limit of a dispensing nozzle is decided automatically.

In addition, Patent Literature 2 describes a technique of implementing re-sensing, and altering the position of a sensing probe by approximately 0.1 to 0.2 mm on the basis of information about the height of the upper end of a vessel, and information about the height of a liquid surface, in order to prevent sensing errors of a sensor.

CITATION LIST

Patent Literatures

Patent Literature 1: JP-2002-350454-A
Patent Literature 2: JP-H11-132830-A

SUMMARY OF INVENTION

Technical Problem

There is a wide variety of combinations of materials and shapes of reagent vessels in automatic analyzers. In particular, in recent years, there are many reagent vessels having bottle bottoms with complicated shapes so as to make it possible to precisely suck reagents in the reagent vessels in areas in the reagent vessels where the liquid volumes of the reagents are small.

In addition, there is a wide variety of properties, such as wettability and viscosity, of reagents. In the case of a reagent with low wettability of a solution in a reagent vessel relative to the reagent vessel, a phenomenon in which the meniscus has a convex shape due to a complicated shape of the bottle bottom is observed. This phenomenon can particularly occur near an area in the reagent vessel where the liquid volume of the reagent therein is small.

Regarding the problem described above, according to the method described in Patent Literature 1, in a case that the meniscus in a reagent vessel has a convex shape, the actual remaining amount is smaller than a predicted remaining amount value obtained by conversion from a height at which a reagent dispensing nozzle (reagent dispensing probe) detects a liquid surface. Thereby, there are a possibility that a sudden decrease of the remaining amount of a reagent managed by an apparatus occurs, and a possibility that poor reagent dispensing (reagent shortage alarm generation, measurement skip) occurs before the number of times of tests that the remaining amount of a reagent managed by an apparatus allows becomes zero or before the remaining amount of the reagent becomes 0 mL, because of a discrepancy between the predicted remaining amount value of the reagent and the actual remaining amount of the reagent, and this brings about an inspection delay.

In addition, according to the method described in Patent Literature 2, while the precision of liquid-surface sensing is enhanced, it is difficult to identify whether or not the meniscus has a convex shape; as a result, similarly to the technique described in Patent Literature 1, an amelioration of the phenomenon in which an actual remaining amount becomes smaller than a predicted remaining amount value obtained by conversion from a detected height of a liquid surface is not attained.

An object of the present invention is to realize an automatic analyzer that makes it possible to set thresholds of measurement items and remaining amounts of reagents as dead volume setting values, and can avoid a situation where it is undesirably determined that there is a remaining amount of a reagent despite the fact that the remaining amount of the reagent actually is almost zero, and suppress poor reagent dispensing.

Solution to Problem

In order to achieve the object described above, the present invention is configured in the following manner.

An automatic analyzer includes: a reagent dispensing mechanism that sucks a reagent in a reagent vessel, and dispenses the sucked reagent to a reaction vessel; an analyzing unit that analyzes a sample in the reaction vessel; a display unit that displays a setting screen on which an operator sets a dead volume setting value of the reagent in the reagent vessel; and a control unit that controls operation of the reagent dispensing mechanism. The control unit judges whether or not an amount of the reagent in the reagent vessel is equal to or larger than the dead volume setting value set on the display screen, and controls the reagent dispensing mechanism to stop the sucking of the reagent from the reagent vessel if the amount of the reagent in the reagent vessel is smaller than the dead volume setting value.

In addition, an automatic analyzer includes: a reagent dispensing mechanism that sucks a reagent in a reagent vessel, and dispenses the sucked reagent to a reaction vessel; an analyzing unit that analyzes a sample in the reaction vessel; a display unit that displays a setting screen having a dead volume setting portion in which an operator sets a dead volume setting value of the reagent in the reagent vessel, and an automatic mode setting portion in which the operator sets an automatic mode; a storage unit that stores the dead volume setting value set in the dead volume setting portion; and a control unit that controls operation of the reagent dispensing mechanism. The control unit: judges whether or not an amount of the reagent in the reagent vessel is equal to or larger than the dead volume setting value set on the display screen; in a case that the amount of the reagent in the reagent vessel is smaller than the dead volume setting value, and the automatic mode is not set, controls the reagent dispensing mechanism to stop the sucking of the reagent from the reagent vessel; in a case that the amount of the reagent in the reagent vessel is smaller than the dead volume setting value, and the automatic mode is set, when there is a discrepancy which is equal to or greater than a certain degree between remaining reagent amount information 1 obtained from the number of times of reagent dispensing of the reagent dispensing mechanism, and remaining reagent amount information 2 obtained from a value of liquid-surface sensing by the liquid surface sensor mechanism, stores, in the storage unit and as a dead volume setting value, a value obtained by adding an alteration amount to the dead volume setting value stored in the storage unit, and controls the reagent dispensing mechanism to stop the sucking of the reagent from the reagent vessel.

Advantageous Effects of Invention

According to the present invention, it is possible to realize an automatic analyzer that makes it possible to set thresholds of measurement items and remaining amounts of reagents as dead volume setting values, and can avoid a situation where it is undesirably determined that there is a remaining amount of a reagent despite the fact that the remaining amount of the reagent actually is almost zero, and suppress poor reagent dispensing.

BRIEF DESCRIPTION OF DRAWINGS

FIG. 3 is a figure for explaining a reagent dispensing mechanism adopting a method of performing sensing on the basis of electrostatic capacitance changes between a reagent dispensing probe and the earth.

FIG. 4 is a figure illustrating one example screen on which a user sets a dead volume setting value for each measurement item.

FIG. 5 is a figure illustrating one example screen on which a dead volume setting value is set for each measurement item and for each reagent bottle shape.

FIG. 6 is a figure illustrating one example screen on which a dead volume setting value is set for each level of reagent wettability.

FIG. 11 is a figure illustrating an example of a dead volume setting value setting screen on which setting values are specified not by test, but in mm.

FIG. 12 is a figure illustrating one example screen on which a user sets a dip amount for each measurement item.

FIG. 13 is a figure illustrating one example screen on which a user sets a dip amount for each measurement item and for each reagent bottle shape.

FIG. 14 is a figure illustrating one example screen on which a user sets a dip amount for each level of reagent wettability.

DESCRIPTION OF EMBODIMENTS

In the following, embodiments for carrying out the present invention are explained with reference to the drawings.

A system that is used in embodiments of the present invention manages remaining amounts of reagents close to the minimum precisely-suckable liquid volumes of the reagents. The system has the function of altering reagent dead volume setting values, and dip amounts of reagent probes below the liquid surfaces of reagents manually or automatically in accordance with user-set conditions, and prevents inspection delays due to poor reagent dispensing.

Embodiments

First Embodiment

In an example explained in a first embodiment, a user (operator) manually performs setting of management of a remaining reagent amount. The first embodiment is explained with reference to FIG. 1 to FIG. 8.

Figure 1:
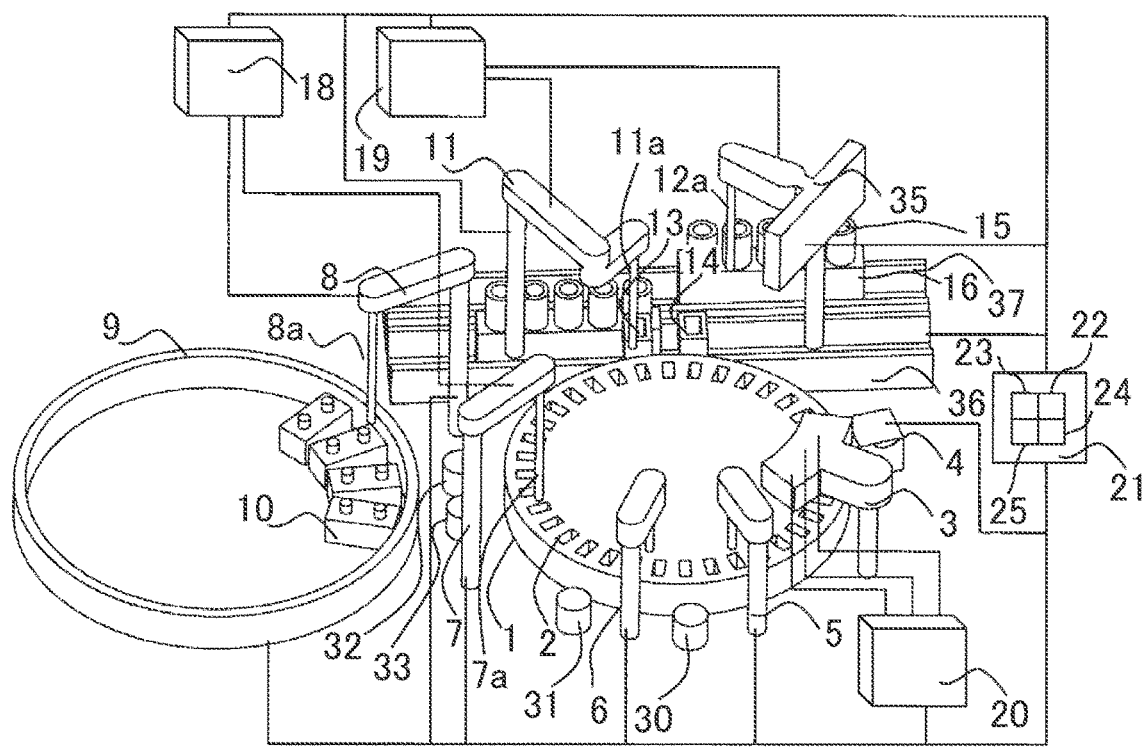
FIG. 1 is an overall schematic configuration diagram of an automatic analyzer to which a first embodiment of the present invention is applied.

FIG. 1 is an overall schematic configuration diagram of an automatic analyzer to which the first embodiment of the present invention is applied.

In FIG. 1, in an automatic analyzer, a plurality of reaction vessels 2 in which reagents and samples such as blood or urine are mixed together are arrayed along the circumference of a reaction disc 1. In a reagent disc 9, a plurality of reagent bottles (reagent vessels) 10 can be placed on the circumference of the reagent disc 9. Rotatable and vertically movable reagent dispensing mechanisms 7 and 8 are installed between the reaction disc 1 and the reagent disc 9, and the reagent dispensing mechanisms 7 and 8 include reagent probes 7a and 8a. A reagent syringe 18 is connected with the reagent probes 7a and 8a. The reagent dispensing mechanism 7 and 8 suck reagents from the reagent bottles 10, and dispense (discharge) the reagents to the reaction vessels 2.

Transfer mechanisms 36 and 37 that move a sample storage vessel 16 on which sample vessels 15 such as test tubes containing samples are placed are installed near the reaction disc 1. Rotatable and vertically movable sample dispensing mechanisms 11 and 35 are installed between the reaction disc 1 and the transfer mechanisms 36 and 37, and the sample dispensing mechanisms 11 and 35 include sample probes 11a and 12a.

A sample syringe 19 is connected with the sample probes 11a and 12a. The sample probes 11a and 12a move along arcs about rotation axes to suck samples from the sample vessels 15, and discharge the samples to the reaction vessels 2.

A cleaning mechanism 3, a light source (not illustrated), a spectrophotometer 4, stirring mechanisms 5 and 6, the reagent disc 9 and the transfer mechanisms 36 and 37 are arranged around the reaction disc 1, and a cleaning pump 20 is connected with the cleaning mechanism 3. Cleaning tanks 13, 14, 30, 31, 32 and 33 are correspondingly installed on the operation ranges of the reagent dispensing mechanisms 7 and 8, sample dispensing mechanisms 11 and 35 and stirring mechanisms 5 and 6. Samples are included in the sample vessels 15, and the sample vessels 15 are placed on the sample storage vessel 16, and carried by the transfer mechanisms 36 and 37.

Light emitted from the light source (not illustrated) is emitted onto a mixture liquid of a sample and a reagent mixed in a reaction vessel 2. The emitted light is received by the spectrophotometer 4. An overall management computer 21 includes an analyzing unit 24. The analyzing unit 24 computes the concentration of a predetermined component included in the sample on the basis of an amount of light (the light amount of light transmitted through the mixture liquid or light scattered by the mixture liquid) received by the spectrophotometer 4, and analyzes the sample. Note that different reagents are used for different measurement items. Automatic analysis is performed in this manner.

The overall management computer 21 includes: a display unit 22 that displays results of analysis, and settings of reagent dead volume setting values; and a storage unit 23 that stores settings of the automatic analyzer. In addition, the overall management computer 21 includes (or is connected to): a manipulation unit through which necessary information is input; a control unit 25 that controls the reagent dispensing mechanisms 7 and 8, the display unit 22 and the like on the basis of settings stored in the storage unit 23; and the like.

Next, mechanisms to sense liquid surfaces in the reagent bottles 10 to be used in a case that the reagent dispensing mechanisms 7 and 8 suck reagents from the reagent bottles 10 are explained.

Methods of liquid-surface sensing by the mechanisms to sense liquid surfaces in the reagent bottle 10 include a method in which sensing is performed on the basis of pressure changes in the reagent dispensing probes 7a and 8a, and a method in which sensing is performed on the basis of electrostatic capacitance changes between the reagent dispensing probes 7a and 8a and the earth.

Figure 2:
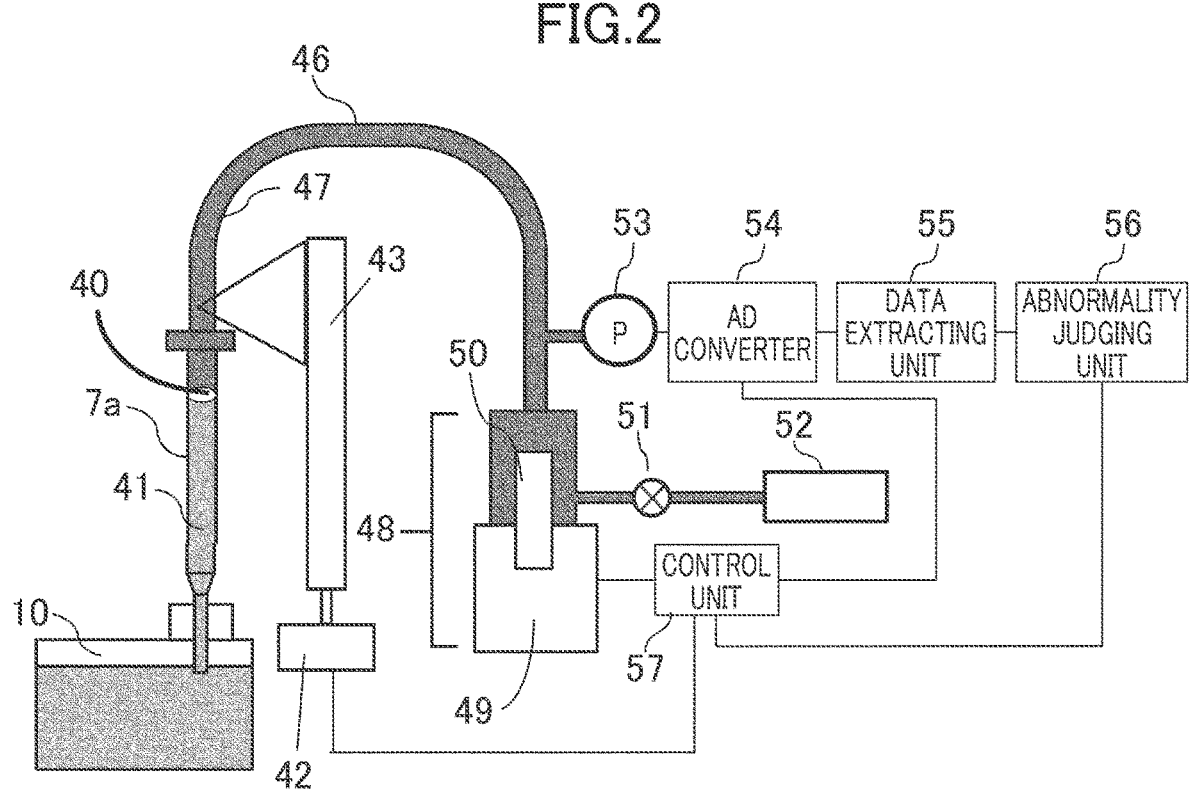
FIG. 2 is a figure for explaining a reagent dispensing mechanism adopting a method of performing sensing on the basis of pressure changes in a reagent dispensing probe.

FIG. 2 is a figure for explaining the reagent dispensing mechanism 7 having a liquid-surface sensing mechanism adopting the method of sensing a liquid surface on the basis of pressure changes in the reagent dispensing probe 7a, and FIG. 3 is a figure for explaining the reagent dispensing mechanism 7 having a liquid-surface sensing mechanism adopting the method of sensing a liquid surface on the basis of electrostatic capacitance changes between the reagent dispensing probe 7a and the earth. The reagent dispensing mechanism 8 also can have a configuration similar to that of the reagent dispensing mechanism 7.

In FIG. 2, a metering pump 48 has a drive mechanism 49 and a plunger 50, and is connected to a pump 52 through a valve 51. In addition, the metering pump 48 is controlled by a control unit 57, and sucks and discharges a reagent. The metering pump 48 and the reagent dispensing probe 7a are connected via a dispensing flow path 46. A pressure sensor 53 is arranged between the plunger 50 and the reagent dispensing probe 7a via the dispensing flow path 46, and detects the pressure inside the reagent dispensing probe 7a.

The pressure sensor 53 is connected to an AD converter 54. The AD converter 54 performs digital conversion of analog voltage data output from the pressure sensor 53.

A data extracting unit 55 receives digital data with a pressure waveform from the AD converter 54, and passes the digital data over to an abnormality judging unit 56. The abnormality judging unit 56 uses the data to judge whether liquid sucking at the reagent dispensing probe 7a is normal or abnormal. Judgement results of the abnormality judging unit 56 are transmitted to the control unit 57. The AD converter 54, the data extracting unit 55, the abnormality judging unit 56 and the control unit 57 can be configured as part of the overall control computer 21.

Before sucking a reagent, the control unit 57 opens the valve 51 to fill the insides of the dispensing flow path 46 and the reagent dispensing probe 7a with a system liquid 47 supplied from the pump 52. Next, in a state that the tip of the reagent dispensing probe 7a is in the air, the control unit 57 uses the drive mechanism 49 to cause the plunger 50 to perform lowering operation, and sucks in segmented air 40.

The reagent dispensing probe 7a is moved vertically by a reagent probe vertical drive mechanism 43 driven by a motor 42. The operation of the motor 42 is controlled by the control unit 57.

The control unit 57 causes the reagent dispensing probe 7a to be lowered to a predetermined height in a reagent vessel 10, and, in a state that the tip of the reagent dispensing probe 7a is immersed in a reagent, lowers the plunger 50 by a predetermined amount, and sucks the reagent into the reagent dispensing probe 7a. Thereby, the reagent is sucked as a sucked liquid 41 into the reagent dispensing probe 7a. The pressure sensor 53 detects a pressure change in the reagent dispensing probe 7a, and, on the basis of the pressure waveform, judges whether or not the probe is contacting the reagent liquid surface at the time of the sucking operation of the probe.

Next, the reagent dispensing mechanism 7 adopting the method of sensing a liquid surface on the basis of electrostatic capacitance changes is explained with reference to FIG. 3.

In the example illustrated in FIG. 3, the pressure sensor 53, the AD converter 54, the data extracting unit 55 and the abnormality judging unit 56, which are included in the example illustrated in FIG. 2, are not included. The example in FIG. 3 includes: an electrostatic capacitance detecting unit 58 that detects the electrostatic capacitance between the reagent dispensing probe 7a and the earth; and an abnormality judging unit 59 that inverts whether or not the electrostatic capacitance detected by the electrostatic capacitance detecting unit 58 is abnormal.

A control unit 5 detects a change of the electrostatic capacitance detected by the electrostatic capacitance detecting unit 58, and, when the reagent dispensing probe 7a is lowered, determines whether or not the reagent dispensing probe 7a has contacted the liquid surface of a reagent. The control unit 57, the electrostatic capacitance detecting unit 58 and the abnormality judging unit 59 can be configured as part of the overall control computer 21.

The present invention may be applied to any of the method of sensing a reagent liquid surface on the basis of pressure changes illustrated in FIG. 2, and the method of sensing a reagent liquid surface on the basis of electrostatic capacitance changes illustrated in FIG. 3.

Note that, in the method of sensing a reagent liquid surface on the basis of pressure changes illustrated in FIG. 2, the reagent dispensing probe is lowered to a preset height, and it is judged whether or not the reagent dispensing probe has reached a reagent liquid surface on the basis of a pressure waveform at the time of sucking operation. On the other hand, in the method of sensing a reagent liquid surface on the basis of electrostatic capacitance changes illustrated in FIG. 3, the reagent dispensing probe is lowered while the electrostatic capacitance is being sensed, and a height at which a change of the electrostatic capacitance is detected is judged as the position of the reagent liquid surface.

The automatic analyzer according to the first embodiment of the present invention has a remaining-reagent-amount management function like the one described below.

In the present first embodiment, reagent information such as reagent names and remaining amounts of reagents used in measurement is registered in the storage unit 23 of the overall management computer 21. The overall management computer 21 manages the remaining amounts of reagents in the reagent vessels 10 mounted on the reagent disc 9 by converting the remaining amounts into the number of remaining tests, by adopting a software counting method in which the remaining amounts are computed by subtracting the amounts of used reagents from reagent amounts registered in the storage unit 23, or a method in which liquid surfaces are sensed by sensors attached to the reagent probes 7a and 8a or by detecting units.

In order to avoid a phenomenon in which poor reagent dispensing (reagent shortage alarm generation, measurement skip) occurs before the number of remaining tests allowed by the remaining amount of a reagent in a reagent vessel 10 close to the minimum precisely-suckable liquid volume of the reagent in the reagent vessel 10 becomes zero, it is necessary to alter a dead volume setting value in a case that the phenomenon occurs.

In a method proposed in the present first embodiment, a user sets, as desired, a dead volume setting value for each measurement item, each shape of the reagent vessels 10, each level of reagent wettability, and each apparatus-specific amount of dipping of the reagent probe 7a and 8a below a reagent liquid surface. The overall management computer 21 ends sucking from a reagent bottle 10 when a user-set reagent dead volume setting value is reached.

Note that dead volumes in the present specification mean minimum precisely-suckable liquid volumes of reagents in the reagent vessels 10, and dead volume setting values mean values set as the dead volumes by a user.

FIG. 4 is a figure illustrating one example screen on which a user sets a dead volume setting value for each measurement item. The dead volume setting screen illustrated in FIG. 4 is displayed on the display unit 22 (dead volume setting screens in examples in FIG. 5 and FIG. 6 mentioned below are also displayed on the display unit 22).

In FIG. 4, the setting of dead volume setting values is performed by using a keyboard, a mouse or the like, which is a manipulation unit, on a setting screen (dead volume setting screen) of a remaining-reagent-amount management method displayed on the screen. This setting screen displays: a setting method selecting portion 201 on which a setting method is selected; and an applicable condition setting portion 202 on which conditions under which settings are applied are set.

In a case that a setting method is set for each measurement item, the applicable condition setting portion (measurement item name setting portion) 202 includes fields in which a user selects target measurement items for which he/she is to perform setting. In addition, a dead volume setting value setting portion 203 in which dead volume setting values are set is a portion where a user can set target dead volume setting values. In addition, check boxes may be provided in order to facilitate switching of settings. On the example screen in FIG. 4, three check boxes are displayed on the left side of the applicable condition setting portion 202, and two check boxes are checked.

That is, according to the settings of those whose settings are made effective, in a case that the number of remaining tests falls below 30 about the setting No. 1, the measurement item IgA, or in a case that the number of remaining tests falls below 50 about the setting No. 2, the measurement item ALB, measurement of a reagent from a reagent bottle 10 in use is ended.

Because the check box corresponding to the setting No. 3, the measurement item Fe, is not checked, that is, because the setting is made ineffective, according to this setting, measurement by sucking of a reagent from a reagent bottle 10 in use is ended in accordance with the number of remaining tests set by default, not in accordance with "35 tests" displayed on the screen. The number of remaining tests set by default is ten, for example.

By allowing a user to set, as desired, measurement items on the dead volume setting value setting screen illustrated in FIG. 4, it is possible to manage remaining reagent amounts close to dead volumes only for measurement items that require setting. Thereby, measures against poor reagent dispensing, as well as the management of reagents, can be executed efficiently.

FIG. 5 is a figure illustrating one example screen on which a dead volume setting value is set for each measurement item and for each bottle shape (vessel shape) of the reagent bottles 10.

On the dead volume setting screen illustrated in FIG. 5, in a case that a user is using reagents managed by using barcodes or the like that are associated with stored reagent bottle shapes, a remaining amount management method can be set for each combination of a reagent bottle shape and a measurement item. At the time point when a user specifies a bottle shape of a reagent vessel 10 in a bottle shape setting portion (vessel shape setting portion) 301, a measurement item having the specified bottle shape is chosen from application information registered by the user, and is displayed in a measurement item name setting portion 302.

In addition, check boxes similar to those illustrated in FIG. 4 may be provided in order to facilitate switching of settings. On the example screen in FIG. 5, two check boxes are checked. That is, regarding the settings of those whose settings are made effective, as illustrated in a dead volume value setting portion 303, in a case that the number of remaining tests falls below 30 about the setting No. 1, the bottle shape type A and the measurement item IgA, and in a case that the number of remaining tests falls below 50 about the setting No. 2, the bottle shape type B and the measurement item ALB, measurement by reagent sucking from a reagent bottle 10 in use is ended.

The check box for the setting No. 3, the bottle shape type C and the measurement item ALB, is not checked. That is, the setting is made ineffective, and so measurement of a reagent from a reagent bottle 10 in use is ended in accordance with the number of remaining tests set by default, not in accordance with "50 tests" displayed on the screen. The number of remaining tests set by default is ten, for example.

By allowing a user to preset, as desired, bottle shapes measurement items on the dead volume setting screen illustrated in FIG. 5, it is possible to manage remaining reagent amounts close to dead volumes only for bottle shapes and measurement items that require setting.

Thereby, the length of time that a user needs for setting can be made shorter. In addition, a user can set target dead volume setting values in the dead volume setting value setting portion 303.

FIG. 6 is a figure illustrating one example screen on which a dead volume setting value is set for each level of reagent wettability. In the case of the example illustrated in FIG. 6, a user can set target measurement items to either of two groups, a low-wettability display portion 401 representing "Wettability: Low" of reagents, and a medium-wettability display portion 402 representing "Wettability: Medium" of reagents. Note that the low-wettability display portion 401 and the medium-wettability display portion 402 are collectively referred to as a reagent wettability display portion.

In addition, check boxes similar to those illustrated in FIG. 4 and FIG. 5 may be provided in order to facilitate switching of settings. On the example screen illustrated in FIG. 6, the dead volume setting value of "Wettability: Low" measurement items is set to 50 tests, and the dead volume setting value of "Wettability: Medium" measurement items is set to 30 tests, in a dead volume setting value setting portion 403.

Regarding the settings of those whose check boxes are checked on the example screen illustrated in FIG. 6, that is, whose settings are made effective, in a case that the number of remaining tests of the "Wettability: Low" measurement item setting No. 1, the measurement item IgA, falls below 50 in accordance with the "Wettability: Low" setting, or in a case that the number of remaining tests of the "Wettability: Medium" measurement item setting No. 1, the measurement item CRE, or the "Wettability: Medium" measurement item setting No. 2, the measurement item CRP, falls below 30, measurement of a reagent from a reagent bottle 10 in use is ended.

Regarding the "Wettability: Low" measurement item setting No. 2, the measurement item ALB, and the "Wettability: Low" measurement item setting No. 3, the measurement item Fe, whose check boxes are not checked, that is, whose settings are made ineffective, measurement by reagent sucking from a reagent bottle 10 in use is ended in accordance with the number of remaining tests set by default. The number of remaining tests set by default is ten, for example.

In addition, in the dead volume setting value setting portion 403, a user can set a dead volume setting value for each group within a manufacturer-specified range. By performing group-by-group setting, a setting value of a target group can be altered collectively, and so the length of time that an operator needs for setting can be made shorter.

As another method of setting of dead volume setting values for reagents in the reagent bottles 10, there is setting by using apparatus-specific values. In a case that apparatus-specific values are selected, manufacturer-specified values are reflected in all measurement items collectively. Note that apparatus-specific values are values that are set depending on dip amounts of the reagent dispensing probes 7a and 8a below reagent liquid surfaces. In this case, instead of the measurement item name setting portion 202 in FIG. 4, a dip amount setting portion is displayed to allow an operator to set a dead volume setting value for each dip amount of the reagent dispensing mechanism 7 or 8 below a reagent liquid surface, in one possible configuration. This setting is applied to all measurement items, and so it is possible to save the labor of the operator most, as compared with other choices of the setting of dead volume setting values.

In addition, the settings of dead volume setting values are stored in the storage unit 23 of the overall management computer 21. A user can select a dead-volume-setting-value setting method suited for an operation environment in terms of working efficiency and amounts of waste reagents, and so the first embodiment of the present invention can be applied to a wide variety of use scenes.

Note that, on the dead volume setting screens illustrated in FIG. 4 to FIG. 6, a user may select dead volume setting values from a plurality of recommended values. In addition, on the dead volume setting screens, a user may select only a setting method, and an applicable range of settings, and manufacturer-set fixed values may be used for dead volume setting values for those that are set.

Figure 7:
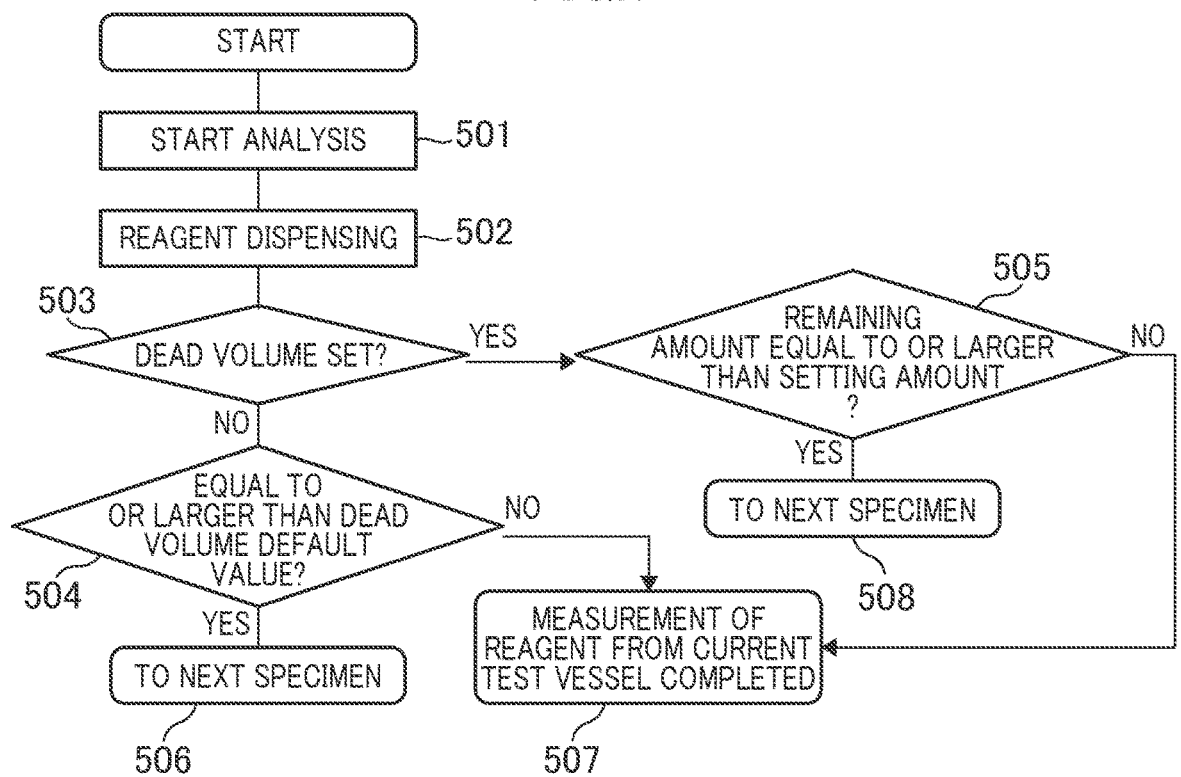
FIG. 7 is an operation flowchart of reagent dispensing in the first embodiment.

FIG. 7 is an operation flowchart of reagent dispensing in the first embodiment. The flow of operations illustrated in FIG. 7 is implemented for each measurement item under the control of the overall management computer 21.

In FIG. 7, analysis is started (Step 501), and a reagent is dispensed by the reagent dispensing probe 7a or 8a (Step 502). At this time of reagent dispensing, it is checked at the storage unit 23 whether a dead volume setting value is set (Step 503). In a case that, at Step 503, a dead volume setting value is not set in the storage unit 23, it is judged by management with a liquid surface sensor (liquid-surface sensing mechanism) or software counting mentioned above whether or not the amount of a reagent in a reagent bottle 10 is equal to or larger than a dead volume default setting value (Step 504).

In a case that, at Step 504, the amount of the reagent in the reagent bottle 10 is equal to or larger than the dead volume default setting value, the process proceeds to the measurement of the next specimen (Step 506).

In a case that, at Step 504, the amount of the reagent in the reagent bottle 10 is smaller than the dead volume default setting value, the reagent dispensing mechanism 7 or 8 is controlled to stop the sucking operation of the reagent from the reagent bottle 10, the measurement by using the reagent in the reagent bottle 10 is completed (Step 507), the reagent bottle 10 is replaced with the next reagent vessel, and the measurement is continued.

In a case that, at Step 503, a dead volume setting value is set, it is identified by management with a liquid surface sensor or software counting mentioned above whether or not the remaining amount of the reagent in the reagent bottle 10 is equal to or larger than the dead volume setting value (Step 505).

In a case that, at Step 505, the remaining amount of the reagent in the reagent bottle 10 is equal to or larger than the dead volume setting value, the process proceeds to the measurement of the next specimen (Step 508).

In a case that, at Step 505, the remaining amount of the reagent in the reagent bottle 10 is smaller than the dead volume setting value, the reagent dispensing mechanism 7 or 8 is controlled to stop the sucking operation of the reagent from the reagent bottle 10, the measurement by using the reagent in the reagent bottle 10 is completed, the use of the reagent bottle 10 is ended (Step 507), the reagent bottle 10 is replaced with the next reagent bottle 10, and the measurement is continued.

Figure 8:
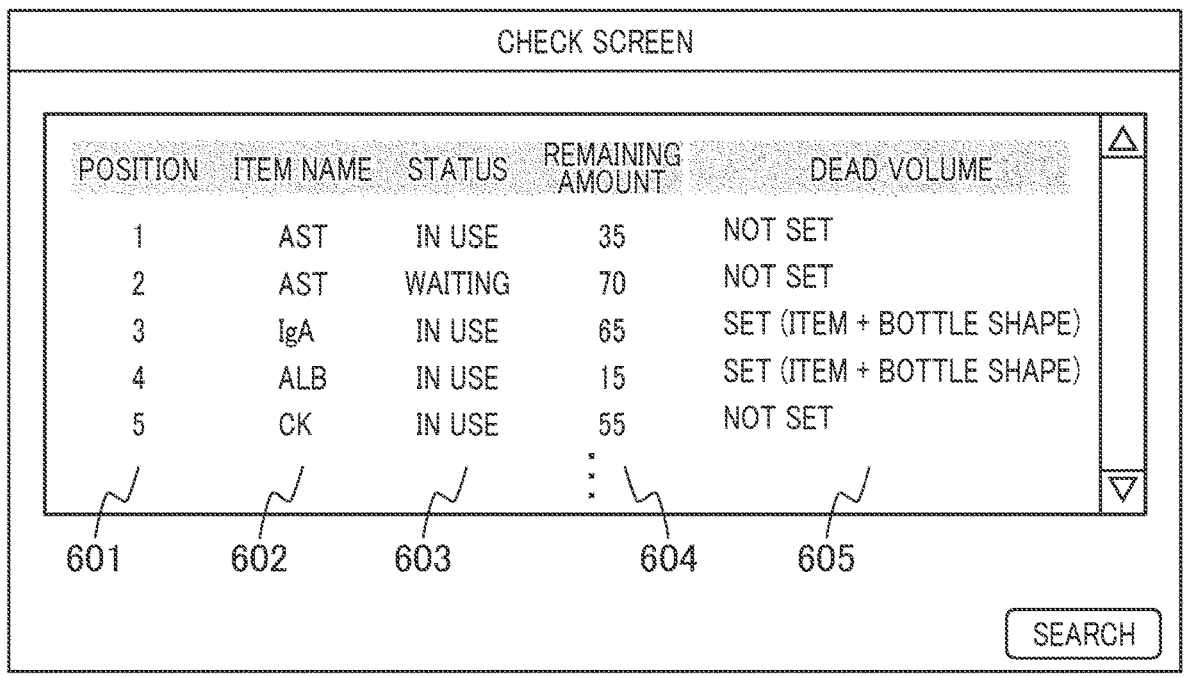
FIG. 8 is a figure illustrating a check screen for checking a status, a remaining reagent amount, and whether or not a dead volume setting value is set, for each measurement item.

FIG. 8 is a figure illustrating a check screen (displayed on the display unit 22) for checking a status, a remaining reagent amount, and whether or not a dead volume setting value is set, for each measurement item. In FIG. 8, about reagents in the reagent disc 9, the check screen displays: a position display portion 601; a measurement item name display portion 602, a use status display portion 603 that displays "in use," "waiting" and the like; a number-of-remaining-tests display portion 604 about the reagents; and a dead volume setting display portion 605.

In the dead volume setting display portion 605, it can be checked whether dead volume setting values are unset or set, and, if dead volume setting values are set, the types of the settings having been selected are displayed. Thereby, it is possible for a user to know whether unnecessary settings are not chosen.

As mentioned above, according to the first embodiment of the present invention, a user can set a dead volume setting value of a reagent in a reagent bottle 10 in advance for each measurement item, for bottle shape and for level of reagent wettability, and reagent dispensing operation is controlled in accordance with the set dead volume setting values (thresholds) in this configuration; as a result, an automatic analyzer that can avoid a situation where it is determined undesirably that there is a remaining amount despite the fact that the remaining amount is actually almost zero, can suppress poor reagent dispensing and can allow efficient reagent management can be realized.

Second Embodiment

Next, a second embodiment of the present invention is explained.

In the second embodiment, the apparatus automatically alters dead volume setting values. The automatic analyzer to which the second embodiment is applied is similar to that in the first embodiment, illustrations and detailed explanations thereof are omitted.

The second embodiment is explained with reference to FIG. 9 and FIG. 10.

In the second embodiment, the automatic analyzer has a system that determines, by software counting or liquid-surface sensing of a reagent in a reagent bottle 10 by a liquid-surface sensing mechanism, whether or not the amount of the reagent has decreased by an amount corresponding to one test, every time the reagent is used once. In a case that there is a discrepancy between decrease information about the reagent obtained by the liquid-surface sensing mechanism, and decrease information about the reagent obtained by the software counting, the value of a corrected dead volume setting value is stored in the storage unit 23 of the overall computer 21 of the automatic analyzer.

Figure 9:
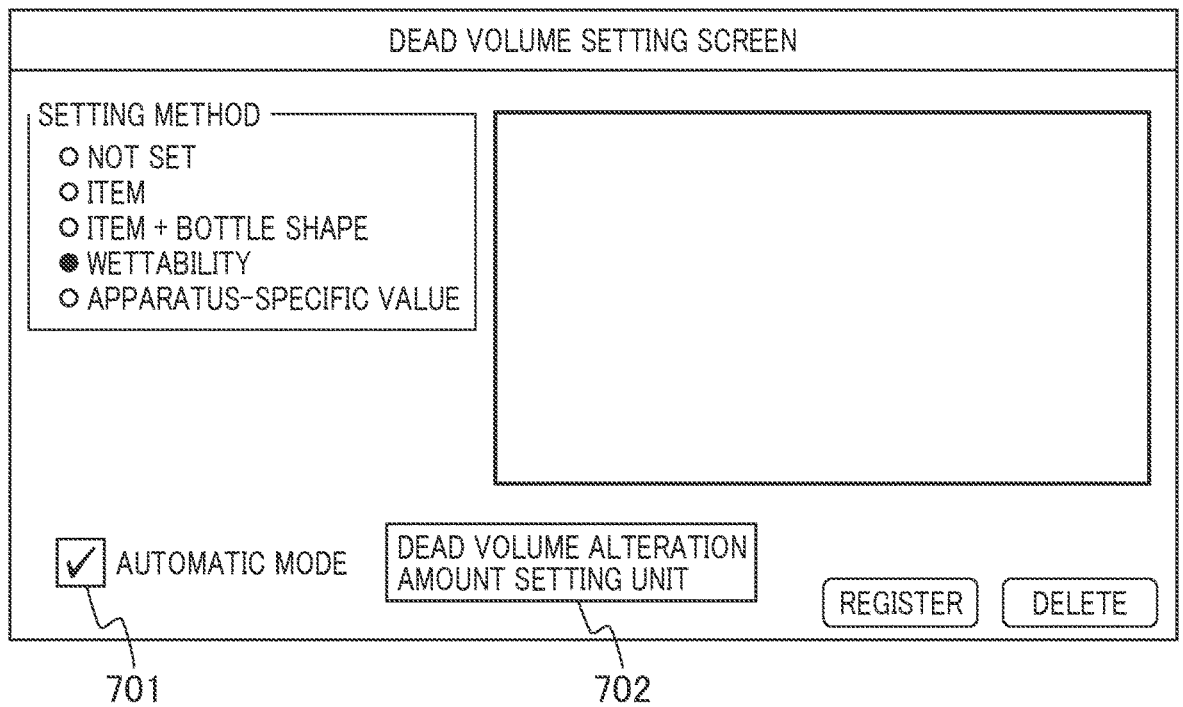
FIG. 9 is a figure illustrating a setting screen of dead volume setting values in a second embodiment.

FIG. 9 is a figure illustrating a dead volume setting screen in the second embodiment.

In FIG. 9, the dead volume setting screen has an automatic mode setting button (automatic mode setting portion) 701 such as a check box that allows the switching of the automatic mode. The automatic mode setting button 701 may be arranged on the screens in the first embodiment. In addition, in order to lower the risk of poor reagent dispensing that occurs immediately before the number of remaining tests allowed by the remaining amount of a reagent closer to a dead volume becomes zero, the first embodiment and the present second embodiment can be implemented simultaneously. By using dead volume setting values set in the method in the first embodiment as reference values, a dead volume installation value is altered in accordance with a preset value in a case that a certain condition is satisfied, in accordance with the flow in the present second embodiment.

Although omitted in FIG. 9, in the second embodiment also, dead volume setting value setting portions can be displayed like the setting screen illustrated in FIG. 4 or 5 or FIG. 6 in the first embodiment, in one possible configuration.

Figure 10:
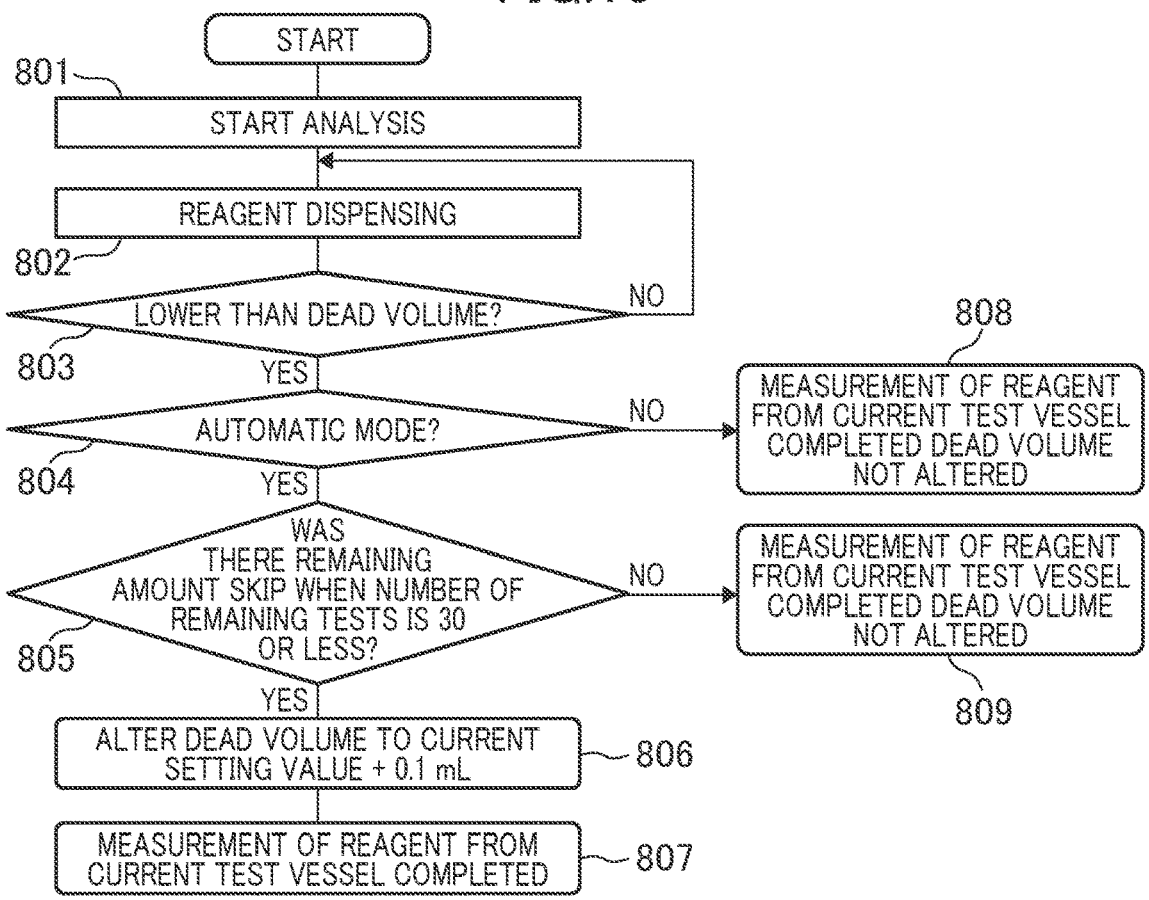
FIG. 10 is an operation flowchart of reagent dispensing in the second embodiment.

FIG. 10 is an operation flowchart of reagent dispensing in the second embodiment.

In FIG. 10, after the start of analysis (Step 801), reagent dispensing is performed (Step 802), and at that time the overall management computer 21 checks, by management with a liquid surface sensor or software counting, whether or not the remaining amount of a reagent in a reagent bottle 10 has become equal to or smaller than a set dead volume installation value (Step 803). In a case that, at Step 803, the remaining amount of the reagent in the reagent bottle 10 is larger than the dead volume setting value, the process returns to Step 802, and when it is requested to use the reagent for the next measurement, the reagent in the reagent bottle 10 is used.

In a case that, at Step 803, the remaining amount of the reagent in the reagent bottle 10 is equal to or smaller than the dead volume setting value, it is checked whether or not the automatic mode is set for dead volumes (Step 804). In a case that, at Step 804, the automatic mode is not set for dead volumes, the measurement of the reagent from the reagent bottle 10 is completed, and the dead volume setting value is not altered (Step 808).

In a case that, at Step 804, the automatic mode is set, the amount of the reagent in the reagent bottle 10 is equal to or smaller than an amount preset as the dead volume setting value, and the number of remaining tests (remaining reagent amount information 1) obtained from a value of liquid-surface sensing by a liquid surface sensor, and the number of remaining tests (remaining reagent amount information 2) computed by software counting are compared with each other to judge, on the basis of information stored in the storage unit 23, whether or not there is a discrepancy between the remaining reagent amount information 1 and the remaining reagent amount information 2 (whether or not there has been a remaining amount skip) which is equal to or greater than a certain degree in the reagent dispensing process in a number of remaining tests (e.g. 30 tests) that have been conducted before the dead volume setting value is reached (Step 805).

In a case that, at Step 805, there is not a discrepancy between the number of remaining tests obtained by the liquid-surface sensing by the liquid surface sensor, and the number of remaining tests computed by the software counting, that is, there has been no remaining amount skips, the measurement by the dispensing of the reagent in the reagent bottle 10 is completed, and the dead volume setting value is not altered (Step 809).

In a case that, at Step 805, a discrepancy between the numbers of remaining tests described above has occurred regarding the reagent in the reagent bottle 10, and the number of remaining tests obtained by the liquid-surface sensing by the sensor is larger than the number of remaining tests computed by the software counting, and the discrepancy is equal to or greater than a certain degree, that is, in a case that there has been a remaining amount skip, the reagent dead volume setting value for this type is altered by adding five tests (alteration amount) to the current setting value (Step 806), and the altered information is stored in the storage unit 23. Thereafter, the measurement by the dispensing of the reagent in the reagent bottle 10 is completed (Step 807).

Because dead volume setting values are altered automatically in the present second embodiment, a user can save the labor of manual setting (alterations of dead volume setting values). In addition, in a case that it is desired not to increase the amount of waste reagents above a certain level, a dead volume upper limit alteration amount value may be set. It is also possible to alter the dead volume alteration amount from +5 to another value. This alteration can be performed at a dead volume alteration amount setting portion 702 illustrated in FIG. 9. By manipulating the dead volume alteration amount installation portion 702, the current dead volume upper limit alteration amount value is displayed in the dead volume alteration amount setting portion 702, and the displayed value can be altered, in one possible configuration.

According to the second embodiment, in addition to advantageous effects similar to those in the first embodiment, in a case that there is a discrepancy between the number of remaining tests obtained by liquid-surface sensing by a liquid-surface sensing mechanism (liquid surface sensor) near a dead volume setting value, and the number of remaining tests computed by software counting (the count (count) of the number of times of reagent dispensing of the reagent dispensing mechanism 7 or 8 by the control unit 25) also, that is, in a case that there has been a remaining amount skip also, the dead volume setting value can be altered to an appropriate value automatically; as a result, it is not necessary for a user to manually alter dead volume setting values, and the burden of the work by the user (operator) can be reduced.

Note that the setting value of the number of tests for which the presence or absence of a remaining amount skip is identified at Step 805 is not limited to 30, but it may be made possible for a user to alter the setting value as desired, in one possible configuration.

In addition, in the first embodiment and the second embodiment, remaining amounts of reagents may be managed and set not as the numbers of tests, but as the volumes or liquid surface heights of the reagents.

For example, as illustrated in FIG. 11, a dead volume setting screen can be a screen on which setting values are specified not as the numbers of remaining tests, but as liquid surface heights mm of reagents.

In addition, while alterations of the settings of dead volumes are explained as one example of a solution to the problem in the first embodiment and the second embodiment, instead of the alterations of dead volume setting values, or simultaneously with the alterations of dead volume setting values, the amounts of dipping of the reagent dispensing probes 7a and 8a below the liquid surfaces in the reagent bottles 10 may be altered in order to reduce the running cost of a user.

As illustrated in FIG. 12 to FIG. 14, a dip amount setting portion 204 (FIG. 12), 304 (FIG. 13) or 404 (FIG. 14) may be displayed, and it may be made possible to set an amount of dipping of a reagent dispensing probe below a liquid surface for each measurement item, for each shape of a reagent vessel and for each level of reagent wettability. In addition, it may be made possible to be able to set dip amounts along with dead volume setting values.

In addition, in the second embodiment, in a case that the amount of the reagent is smaller than the dead volume default value (Step 803), the automatic mode is set (Step 804), and a remaining amount skip has occurred in a predetermined number of remaining tests that have been conducted before the dead volume setting value is reached (Step 805), the amount of dipping below the liquid surface in the reagent bottle 10 may be made 0.01 mm greater than the amount of dipping that has been set up to that point. It should be noted however that alterations of the amounts of dipping of the reagent dispensing probes 7a and 8a below reagent liquid surfaces need to be performed in such a range that the alterations do not accompany changes in the sucking environment near the bottom surfaces of reagent bottles 10. Accordingly, a user performs the setting within a manufacturer-specified range such as 0 to 0.3 mm.

In addition, the invention described in Claims is not limited by the embodiments described above, but various embodiments not deviating the idea of the invention are included in the invention.

LIST OF REFERENCE SIGNS

1: Reaction disc
2: Reaction vessel
3: Cleaning mechanism
4: Spectrophotometer
5, 6: Stirring mechanism
7, 8: Reagent dispensing mechanism
7a, 8a: Reagent dispensing probe
9: Reagent disc
10: Reagent bottle (reagent vessel)
11, 35: Sample dispensing mechanism
11a, 12a: Sample dispensing probe
13, 14, 30, 31, 32, 33: Cleaning tank
15, 16: Sample vessel
18: Reagent syringe
19: Sample syringe
20: Cleaning pump
21: Overall management computer
22: Display unit
23: Storage unit
24: Analyzing unit
36, 37: Transfer mechanism
40: Segmented air
41: Sucked liquid
42: Motor
43: Reagent probe vertical drive mechanism
46: Dispensing flow path
47: System liquid
48: Metering pump
49: Drive mechanism
50: Plunger
51: Valve
52: Pump
53: Pressure sensor
54: AD converter
55: Data extracting unit
56, 59: Abnormality judging unit
57: Control unit
58: Electrostatic capacitance detecting unit
201: Setting method selecting unit portion
202: Applicable condition setting portion
203, 303, 403: Dead volume value setting portion
204, 304, 404: Dip amount setting portion
301: Bottle shape setting portion
302: Measurement item name setting portion
401, 402: Low-wettability display portion
601: Reagent position display portion of
602: Measurement item name display portion
603: Use status display portion
604: Reagent number-of-remaining-tests display portion of
605: Dead volume setting display portion
701: Automatic mode setting button
702: Dead volume alteration amount setting portion

The invention claimed is:

1. An automatic analyzer comprising:
a reagent dispensing mechanism that sucks a reagent in a reagent vessel, and dispenses the sucked reagent to a reaction vessel;
an analyzing unit that analyzes a sample in the reaction vessel;
a storage unit storing a plurality of dead volume setting values of the reagent in the reagent vessel; and
a control unit configured to control operation of the reagent dispensing mechanism, wherein
the control unit is further configured to determine whether an amount of the reagent in the reagent vessel is smaller than one of the plurality of dead volume setting values stored by the storage unit, and to control the reagent dispensing mechanism to stop the sucking of the reagent from the reagent vessel if the amount of the reagent in the reagent vessel is smaller than said one dead volume setting value, and
each of the plurality of dead volume setting values is associated with one of a plurality of wettability levels of the reagent.

2. The automatic analyzer according to claim 1, wherein each of the plurality of wettability levels of the reagent of the dead volume setting values is also associated with a plurality of reagent measurement items.

3. The automatic analyzer according to claim 2, wherein of the plurality of wettability levels of the reagent of the dead volume setting values is also associated with a plurality of reagent vessel shapes.

4. The automatic analyzer according to claim 1, wherein the storage unit stores, for each of a plurality of reagent measurement items, a value of an amount of dipping below a liquid surface of the reagent by the reagent dispensing mechanism.

5. The automatic analyzer according to claim 4, wherein the storage unit stores, for each of a plurality of reagent vessel shapes, the value of an amount of dipping below a liquid surface of the reagent by the reagent dispensing mechanism.

6. The automatic analyzer according to claim 4, wherein the storage unit stores, for each of the plurality of levels of wettability of the reagent, the value of an amount of dipping below a liquid surface of the reagent by the reagent dispensing mechanism.

7. The automatic analyzer according to claim 1, further comprising a liquid-surface sensing mechanism that senses a liquid surface of the reagent.

8. An automatic analyzer comprising:
a reagent dispensing mechanism that sucks a reagent in a reagent vessel, and dispenses the sucked reagent to a reaction vessel;
an analyzing unit that analyzes a sample in the reaction vessel;
a storage unit that stores a plurality of dead volume setting values of the reagent in the reagent vessel, information indicating whether an automatic mode is set, and a setting value necessary for analysis; and
a control unit configured to control operation of the reagent dispensing mechanism, wherein
the control unit is further configured to
determine whether an amount of the reagent in the reagent vessel is equal to or smaller than one of the plurality of dead volume setting values stored in the storage unit,
in a case that the amount of the reagent in the reagent vessel is equal to or smaller than said one dead volume setting value, and the automatic mode is not set, control the reagent dispensing mechanism to stop the sucking of the reagent from the reagent vessel,
in a case that the amount of the reagent in the reagent vessel is equal to or smaller than said one dead volume setting value, and the automatic mode is set, determine whether there is a discrepancy which is equal to or greater than a degree between remaining reagent amount information obtained from the number of times of reagent dispensing of the reagent dispensing mechanism, and remaining reagent amount information comprising a predetermined number of remaining tests based on a value of liquid-surface sensing obtained by a liquid surface sensor mechanism, the predetermined number of tests having been conducted before said one dead volume setting value is reached, and
in a case that there has been a discrepancy which is equal to or greater than the degree, store, in the storage unit and as said one dead volume setting value, a value obtained by adding an alteration amount to the dead volume setting value stored in the storage unit, and control the reagent dispensing mechanism to stop the sucking of the reagent from the reagent vessel, and
each of the plurality of dead volume setting values is associated with one of a plurality of wettability levels of the reagent.

9. The automatic analyzer according to claim 8, wherein each of the plurality of wettability levels of the reagent of the dead volume setting values is also associated with a plurality of reagent measurement items.

10. The automatic analyzer according to claim 9, wherein the storage unit stores, for each of a plurality of reagent vessel shapes, the value of an amount of dipping below a liquid surface of the reagent by the reagent dispensing mechanism.

11. The automatic analyzer according to claim 9, wherein of the plurality of wettability levels of the reagent of the dead volume setting values is also associated with a plurality of reagent vessel shapes.

12. The automatic analyzer according to claim 8, wherein the storage unit stores, for each of a plurality of reagent measurement items, a value of an amount of dipping below a liquid surface of the reagent by the reagent dispensing mechanism.

13. The automatic analyzer according to claim 8, wherein the storage unit stores, for each of the plurality of levels of wettability of the reagent, the value of an amount of dipping below a liquid surface of the reagent by the reagent dispensing mechanism.

* * * * *